Nov. 22, 1966  C. J. KAPLAN  3,286,471
SOLID PROPELLANT ROCKET MOTOR
Filed Sept. 30, 1963
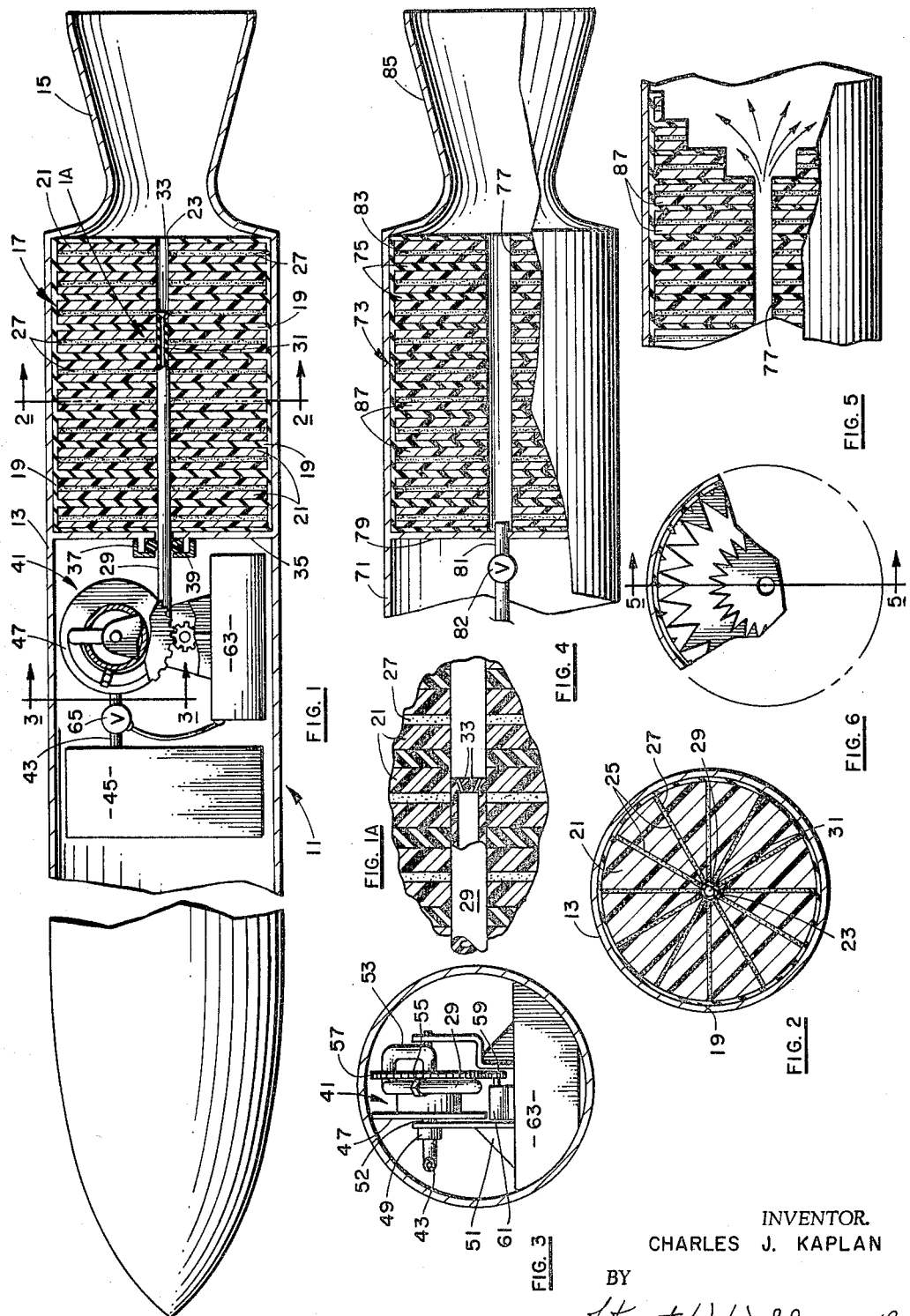
INVENTOR.
CHARLES J. KAPLAN
BY
Stuart W. Wohlgemuth
ATTORNEY

United States Patent Office 3,286,471
Patented Nov. 22, 1966

3,286,471
SOLID PROPELLANT ROCKET MOTOR
Charles J. Kaplan, Woodland Hills, Calif., assignor to
North American Aviation, Inc.
Filed Sept. 30, 1963, Ser. No. 313,411
1 Claim. (Cl. 60—254)

This invention relates to a method and device for throttling a solid propellant rocket. More particularly, the invention relates to a design of solid propellant grain which can be ignited only along an axial core and a method and device for control of propagation of ignition along the axial core.

Once a solid propellant grain has been ignited by an igniter assembly or a squib, the propellant will continue burning at a given burning rate depending on the chamber pressure, the composition of the grain and other variable factors. One of the drawbacks in the utilization of the solid propellant motor is that it cannot be stopped or throttled once it has been started as can a liquid engine by merely shutting off or modulating the flow of the fuel and oxidizer to the injector. For applications requiring a burst of energy or thrust to be repeated or to be of controlled duration, the solid rocket propellant to date has not been satisfactory relative to its inability to stop or restart. Uses for this application could be found for example, in the positioning of a lunar landing module and the like where it would be desired to maneuver and position the vehicle.

Previous to the herein invention, attempts have been made at throttling solid propellant rockets. One of the methods previously attempted has been by varying the nozzle area of the rocket. The mechanical structures involved for varying the nozzle area are heavy and require a wide pressure range. Additionally, this method cannot stop and start the motor. It merely modulates to some degree. Additionally, throttling has been attempted by throwing a liquid over the surface of a propellant grain or flowing the liquid through tubes inserted into the propellant grain. Fluid utilized in these applications has been often gaseous nitrogen. This method is not satisfactory in that it requires a large magnitude of control fluid.

Thus, it is an object of this invention to provide a method and device for effectively throttling the burning of a solid propellant grain with a low weight of control device and fluid.

Another object of this invention is to provide one embodiment of a method and device for effectively stopping and restarting the burning of a solid propellant grain in a rocket motor.

A further object of this invention is to provide a solid propellant rocket motor grain having a rapid response to control changes when used with throttling.

These and other objects will be explained in more detail from the following description in which:

FIG. 1 is a pictorial representation of a solid propellant rocket motor embracing an embodiment of the invention for a restartable solid propellant, FIG. 1A is an enlarged sectioned view of the grain and fluid injection means taken from line 1A of FIG. 1, FIG. 2 is a cross-sectional view of a grain of the invention having pyrotechnic strands therein to accelerate burning, FIG. 3 is a pictorial representation of the side view of a control mechanism used in the motor of FIG. 1, FIG. 4 is a pictorial representation of a rocket motor and the grain embracing the throttable (but not restratable) embodiment of the invention, FIG. 5 shows the typical burning configuration of the grain in FIG. 3, and FIG. 6 is an end view of FIG. 5.

The invention broadly embraces the segmentation of the solid propellant grain into many closely spaced transverse layers of propellant separated by thin membranes of inhibitor. A non-inhibited central core extends the length of the grains of the invention along which the burning may propagate from segment to segment. The rate of propagation of ignition along the central core or hole is controlled by a flow rate of a quenching fluid directed through the core or in an embodiment of the invention by a controlled withdrawal of a plug that moves axially through the core. In one embodiment of the invention utilizing a movable plug through the core, the motor may be stopped by stopping movement of the core and restarted by spraying of hypergolic liquid through the plug onto the grain. In a further embodiment of the invention provision can be made for rapid radial propagation of the burning by means of a radial pattern of controlled voids or pyrotechnic strands in each layer of the grain thus making possible good response rate in a large diameter grain despite low inherent burning rates. It is believed the invention will be described in more detail in the following description.

FIG. 1 depicts a solid propellant rocket motor 11 having an outer casing 13 with a conventional nozzle 15 attached to the aft end thereof. Situated within the motor in the aft compartment thereof and adjacent the nozzle 15 is a solid propellant grain 17 of the invention. Surrounding the entire grain and bonding it to the motor case in a conventional inhibitor 19 of a rubber-like material. The inhibitor often will be close to the same composition found in the binder matrix of the solid propellant itself. In the embodiment shown in FIG. 1 the grain is divided into individual circular segments of solid propellant 21. Each segment has a hole disposed at the center thereof. As is particularly seen in FIG. 2, a plurality of apertures 25 extend radially from the hole 23 in a wagon spoke fashion. These circular holes may be drilled in each segment of the grain utilized. Situated within these apertures 25 are pyrotechnic strands 27 which serve to accelerate the burning of the grain in a radial direction. Alternatively, the strands may be cast in situ in the segments. The pyrotechnic strands may be of material such as spittercord or any of the materials disclosed in co-pending application, Serial No. 309,368, filed Sept. 12, 1963, now abandoned. Between each segment of propellant 21 is situated additional restrictor material 19. As a result, each segment of propellant 21 is physically separated and displaced from the adjacent segment of propellant by means of a restrictive inhibitor which will prevent burning of the propellant in longitudinal direction from segment to segment. Disposed within the the center hole 23 of the grain is a flexible hose 29 of a plastic or rubber-like material. The hose 29 is provided with a center aperture 31 and nozzles 33 at the end thereof, as particularly seen in FIG. 1A. The nozzles 33 are at an angle such that fluid directed through the hose will be sprayed radially at one layer of propellant at its uninhibited core surface. The forward or head end of the grain is restricted by a configuration of the outer metal rocket motor casing 35. The partition 35 has a housing 37 constructed concentrically about the axis to house an O-ring seal 39. This provides for tight fit between the hose 29 and the partition 35 such that there can be no forward flow of propellant gas or propagation of ignition resulting therefrom.

A reel mechanism 41 as shown in particular detail in FIG. 3 is utilized to actuate the hose 29. A pipe line 43 conducts the hypergolic liquid 45 to the reel mechanism 41 from where it is passed through the hose 29 into the propellant grain. The pipe line 43 connects to the side of the reel 47 at a rotatable seal 49 on one side of a support structure 51 supporting the reel mechanism. Continuing from the rotatable seal, the flow continues through the second line 52 serving as an axle for the reel to the opposite side of the support structure. After passing through the reel, the line 52 is bent into a U-shape 53 returning to the center portion of the reel where the hose 29 is connected by means of a conventional connector 55. One side of the reel is gear 57 which engages with a pinion 59 driven by servo motor 61. A control circuit 63 serves to modulate the speed of the motor 61 and thus modulates the rate of movement of the hose 29 through the grain. Additionally, the control circuit can serve to control the valve 65 admitting the hypergolic liquid to the hose 29. The controls can be pre-set or actuated on command during the flight of the vehicle. Other means can be used to retract the hose 29, such not forming a critical design component of the invention.

The propellant that forms the grain may be of a conventional solid propellant composition. For example, it can be a composite propellant comprised of a rubbery binder matrix such as carboxy-terminated linear polybuadiene. Additionally, the matrix will have dispersed therein, solid particular oxidizer particles such as ammonium perchlorate. Often the propellant will additionally have metal powder which serves as an additional fuel. The powder quite often is aluminum. The hypergolic liquids that are stored in tank 45 may be any known conventional one that will ignite a propellant by hypergolic action on contact. An example of such is nitrogen tetroxide. In the operation the forward motion of the hose 29 exposes successive propellant layers 21 to ignition from the hypergolic fluid being sprayed from nozzle 23. The rate of propagation along the center core 23 controls the average thrust in direct proportion to the rate of movement of the hose which actually serves as a plug. Stopping movement of the hose terminates the thrust since the propellant will not burn past restrictor material. This system, of course, additionally elminates the need for an ignitor squib to initially start the motor since the hypergolic fluid will accomplish this purpose. The radial ignition of the propellant is greatly enhanced by the ignition of the pyrotechnic strands 27 which serve to expose additional surface area of the propellant and thus raise the burning rate. The pyrotechnic strands reduce the total burning time of each layer thus reducing the time for response of the system to a change in rate imposed by the servo motor control.

FIG. 4 discloses a fixed plug in the propellant grain configuration of the invention used when a quenching fluid is utilized to control the rate of propagation of burning. In the embodiment shown in FIG. 4, motor case 71 encloses a grain 73 of the essentially same construction as the grain 17 disclosed in the embodiment of FIG. 1. Inhibitor 75 is provided on the outer circumference of the grain and between individual layers thereof. The cylindrical grain is provided with an aperture 77 along its center axis through which the quenching fluid can be directed and wherein the propellant surface is uninhibited. At the head end of the grain, there is provided a partition 79 which serves to restrict the final burning of the grain and separate it from the rest of the missile. Entering the partition is a line 81 having a valve 82 therein which directs a quenching fluid from a storage source in the vehicle into the aperture 77. Pyrotechnic strands 83 present in this embodiment are as that in FIG. 1 serving to provide rapid radial burning. The motor can be ignited at the aft end towards the nozzle 85 by means of a conventional ignitor squib (not shown). Each propellant layer 87 ignites at its exposed surface at the center port 77 and by means of the pyrotechnic strands 83, burning propagates rapidly in a radial outward direction. The inhibitor layers 75 are sufficient so that each layer of propellant 87 can burn completely without igniting the next adjacent layer. Thus, each layer may ignite only at its exposed surface along the surface of the center core 77. The rate at which the propagation takes place toward the forward end along the core 77 is controlled by the rate or pressure at which the quenching fluid is admitted from line 81 to flow down the core 77. The greater the flow or pressure of fluid, the lower the rate of propagation. This is in turn controlled by modulation of the valve 82.

In both FIG. 1 and FIG. 4 schemes, the rate of forward propagation is such that several layers are ignited in the time required for one layer to be consumed, the propellant surface will appear during burning as shown particularly in FIGS. 5 and 6 wherein several layers are in a partially consumed state. Referring to FIGS. 5 and 6, the thrust produced by the motor would fluctuate at a frequency equal to the rate of ignition of the successive layers. The average thrust would be proportional to this rate. As the rate of propagation is increased, both the frequency and average thrust will increase accordingly. By the operation of the control valve 82, the amount of quenching fluid may so regulate the effective amount of thrust produced. Similarly, in the embodiment of FIG. 1, the rate of withdrawal of the plug regulates the thrust produced.

In an additional embodiment of the invention, instead of the utilization of pyrotechnic strands to radially ignite the propellant and increase the burning rate, voids may be cast in segments of propellant in place of the strands and in a similar radial pattern to FIG. 7.

Although the invention has been described and illustrated in detail, it is to be clearly understood that the same is by way of illustration and example only and is not to be taken by way of limitation, the spirit and scope of this invention being limited only by the terms of the appended claim.

I claim:
A solid propellant rocket motor comprising:
a housing with an exhaust nozzle at the aft end thereof,
a solid propellant grain disposed in said housing, said grain comprising:
  a plurality of adjoining circular disc-shaped segments of solid propellant having a coextensive aperture at their center axis,
  burning inhibitor disposed between adjoining segments,
  and means for injecting a hypergol fluid through said center aperture, said means comprising:
    a retractable means for carrying said fluid through said aperture,
    said retractable means disposed initially in said aperture the length of said grain,
    means for feeding said hypergol through said retractable means,
    and means for retracting said retractable means from said aperture.

References Cited by the Examiner

UNITED STATES PATENTS

| | | | |
|---|---|---|---|
| 2,974,484 | 3/1961 | Cooley | 60—39.47 |
| 2,990,682 | 7/1961 | Mullaney | 60—35.6 |
| 2,995,011 | 8/1961 | Kimmel | 60—35.6 |
| 2,995,091 | 8/1961 | Haymes et al. | 60—35.6 X |
| 3,048,112 | 8/1962 | Shope | 60—35.6 X |
| 3,065,598 | 11/1962 | Schultz | 60—35.6 X |
| 3,128,600 | 4/1964 | Oldham | 60—39.47 X |
| 3,130,672 | 4/1964 | Webb | 60—39.47 X |
| 3,136,120 | 6/1964 | Grosh | 60—35.6 |
| 3,136,122 | 6/1964 | McJones | 60—39.47 |
| 3,140,663 | 7/1964 | Rumbel et al. | 60—35.6 X |
| 3,144,751 | 8/1964 | Blackman et al. | 60—35.6 |
| 3,159,104 | 12/1964 | Hodgson | 60—35.6 |
| 3,182,451 | 5/1965 | Messerly | 60—35.6 |

CARLTON R. CROYLE, *Examiner.*

MARK NEWMAN, *Primary Examiner.*